US006772553B2

(12) United States Patent
Phillips et al.

(10) Patent No.: US 6,772,553 B2
(45) Date of Patent: Aug. 10, 2004

(54) ANTI-SNAG FISHING JIG

(75) Inventors: Rick A. Phillips, Olathe, KS (US); Harold D. Rodgers, Olathe, KS (US); Jerome D. Kracht, Overland Park, KS (US); Donald F. Cobb, Junction City, KS (US)

(73) Assignee: Innovative Jigs, LLC, Olathe, KS (US)

( * ) Notice: Subject to any disclaimer, the term of this patent is extended or adjusted under 35 U.S.C. 154(b) by 0 days.

(21) Appl. No.: 10/629,181

(22) Filed: Jul. 29, 2003

(65) Prior Publication Data

US 2004/0031187 A1 Feb. 19, 2004

Related U.S. Application Data

(63) Continuation-in-part of application No. 10/219,177, filed on Aug. 15, 2002, now abandoned.

(51) Int. Cl.[7] .......................... A01K 85/00; A01K 85/10
(52) U.S. Cl. ...................... 43/42.39; 43/42.4; 43/42.37; 43/42.11; 43/44.8
(58) Field of Search .............................. 43/42.39, 42.4, 43/42.42, 43.2, 43.16, 44.81, 42.08, 42.37, 42.11, 42.13, 44.8, 44.82

(56) References Cited

U.S. PATENT DOCUMENTS

| | | | | |
|---|---|---|---|---|
| 1,315,408 A | * | 9/1919 | Rabbeth | ................... 43/42.39 |
| 1,707,407 A | * | 4/1929 | Miles | ........................ 43/42.4 |
| 1,820,887 A | * | 8/1931 | Pflueger | .................. 43/44.128 |
| 2,589,007 A | | 3/1952 | Landon | |
| 2,696,693 A | | 12/1954 | Markquart | |
| 2,994,151 A | | 8/1961 | Webb | |
| 3,191,336 A | | 6/1965 | Cordell, Jr. | |
| 3,344,549 A | * | 10/1967 | Peters et al. | ............... 43/42.11 |
| 3,550,306 A | | 12/1970 | Heitman | |

(List continued on next page.)

FOREIGN PATENT DOCUMENTS

GB     27166     12/1911

OTHER PUBLICATIONS

Stevens, Chris, Jigs, Available web site: www.bassfishingusa.com/Articles/ChrisSteven/CS–Article–05.html, Acessed On: Mar. 15, 2004.*

Yarbough, Jimmy, Triton Pros Ron Shuffield and Marty Carter Say: Think Jig When You Need Big, Available web site: www.americanbassangler.com/magazinearticles/thinkjig.pdf, Acessed On: Mar. 15, 2004.*

Tucker, Tim, (1995), Lure Mangling–the Professional Way Change hooks, clips barbs; do what it takes to improve lure performance, Available web site: www.boats.com/content/default_detail.jsp?contentid=2185, Accessed on Mar. 18, 2004.*

Hart, David (Jul. 2003), inside Pro Fishing Jig Modifications, BASS Times, Available web site: http://espn.go.com/outdoors/bassmaster/s/b_fea_bt_0307_inside_pro_fishing_jig.html, Accessed on: Mar. 18, 2004.*

Justice, Chuck, (Mar. 2002), Tricks that I use on Jigs, Available web site: www.chuckjustice.com/march2002.html, Acessed on Mar. 18, 2004.*

Drawing of anti–snag fishing jig believed to have been in public use and on sale for a number of years.

*Primary Examiner*—Darren W. Ark
(74) *Attorney, Agent, or Firm*—Mark E. Brown

(57) ABSTRACT

An anti-snag fishing jig includes a body with a generally spherical configuration, an exterior surface and an interior. A fishhook includes a shaft, which passes through the body interior and is secured therein. The shaft includes a proximate end forming an eyelet for attaching a line and a distal end forming a barb. A deflector extends upwardly and rearwardly from the body and terminates in front of the fishhook barb. The jig is coated with paint or some other suitable coating for visibility and protection.

16 Claims, 17 Drawing Sheets

U.S. PATENT DOCUMENTS

| | | | | |
|---|---|---|---|---|
| 3,579,892 A | * | 5/1971 | Olvey, Sr. | 43/42.11 |
| 3,611,614 A | | 10/1971 | Ward | |
| 3,750,321 A | | 8/1973 | McClellan | |
| 3,909,974 A | | 10/1975 | Kent | |
| 3,996,688 A | * | 12/1976 | Hardwicke, III | 43/42.11 |
| 4,037,345 A | * | 7/1977 | Dubois | 43/42.13 |
| 4,123,870 A | * | 11/1978 | Wiskirchen | 43/42.39 |
| 4,219,956 A | * | 9/1980 | Hedman | 43/44.8 |
| 4,280,296 A | | 7/1981 | Volenec | |
| 4,470,217 A | * | 9/1984 | Adams | 43/44.8 |
| 4,713,907 A | | 12/1987 | Dudeck | |
| 4,777,758 A | | 10/1988 | Phillips | |
| 4,790,101 A | | 12/1988 | Craddock | |
| 4,791,749 A | | 12/1988 | Stazo | |
| 4,819,366 A | | 4/1989 | Manno | |
| 4,858,367 A | | 8/1989 | Rabideau | |
| 4,862,629 A | | 9/1989 | Ryan | |
| 4,864,766 A | | 9/1989 | Bohn | |
| 4,899,483 A | * | 2/1990 | Pippert | 43/42.42 |
| 5,081,786 A | | 1/1992 | Cobb | |
| 5,092,073 A | | 3/1992 | Kaecker | |
| 5,136,801 A | * | 8/1992 | Pond | 43/42.13 |
| 5,216,830 A | * | 6/1993 | Brott, II | 43/42.39 |
| 5,222,321 A | | 6/1993 | Lu | |
| 5,231,786 A | | 8/1993 | Hughes | |
| 5,245,783 A | | 9/1993 | Cumiskey | |
| 5,339,559 A | | 8/1994 | Strobbe | |
| 5,491,927 A | | 2/1996 | Ortiz | |
| 5,551,185 A | | 9/1996 | Reed | |
| 5,588,247 A | * | 12/1996 | Wicht | 43/42.4 |
| 5,649,384 A | * | 7/1997 | Manning | 43/42.39 |
| 5,822,914 A | * | 10/1998 | Tadych | 43/42.39 |
| 5,845,429 A | | 12/1998 | Battaglia | |
| 5,899,015 A | | 5/1999 | Link | |
| 5,930,941 A | * | 8/1999 | Hayes II et al. | 43/42.13 |
| 5,956,886 A | * | 9/1999 | Choate | 43/42.13 |
| 6,085,456 A | * | 7/2000 | Battaglia | 43/44.8 |
| 6,481,149 B1 | | 11/2002 | Hall, IV et al. | |

\* cited by examiner

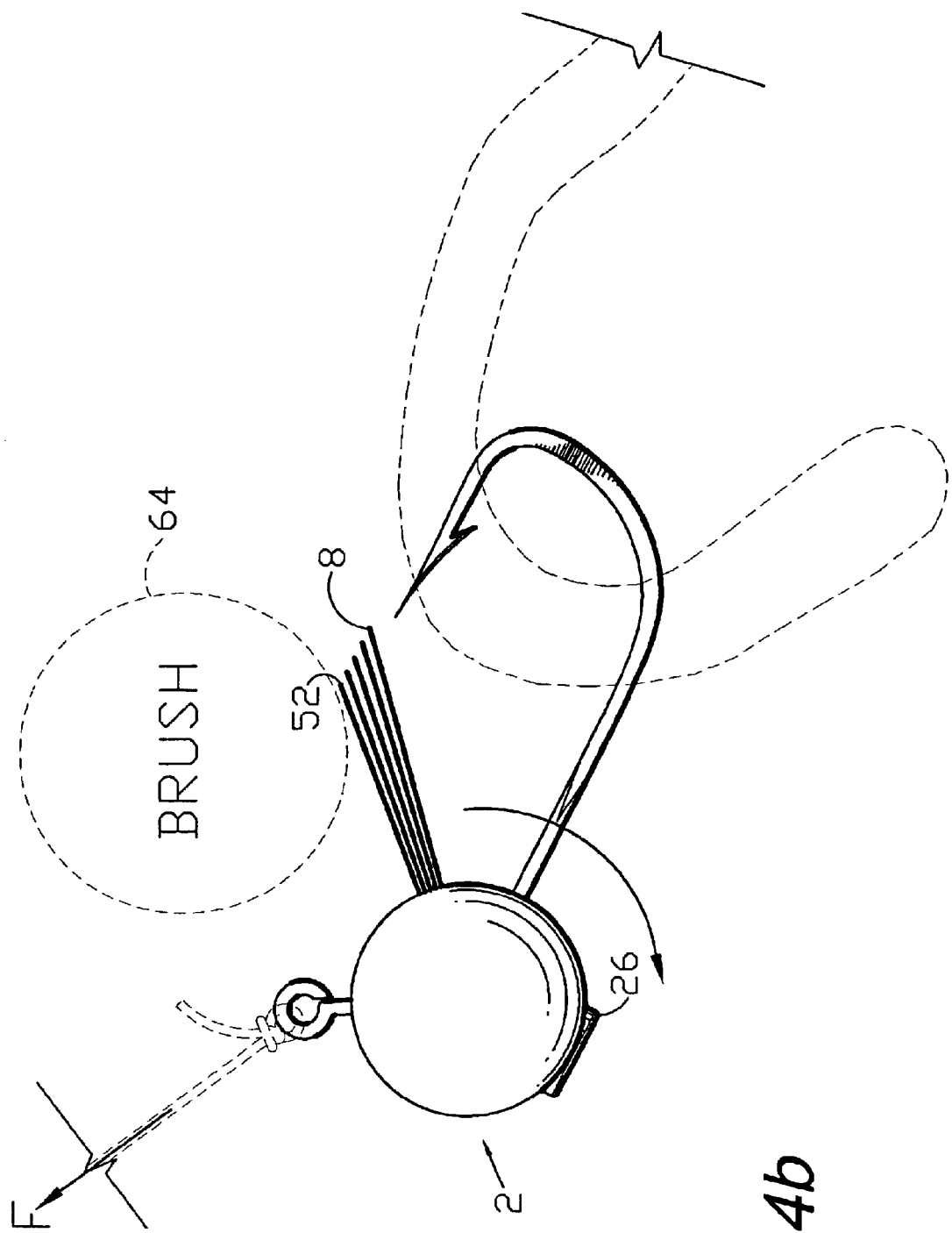

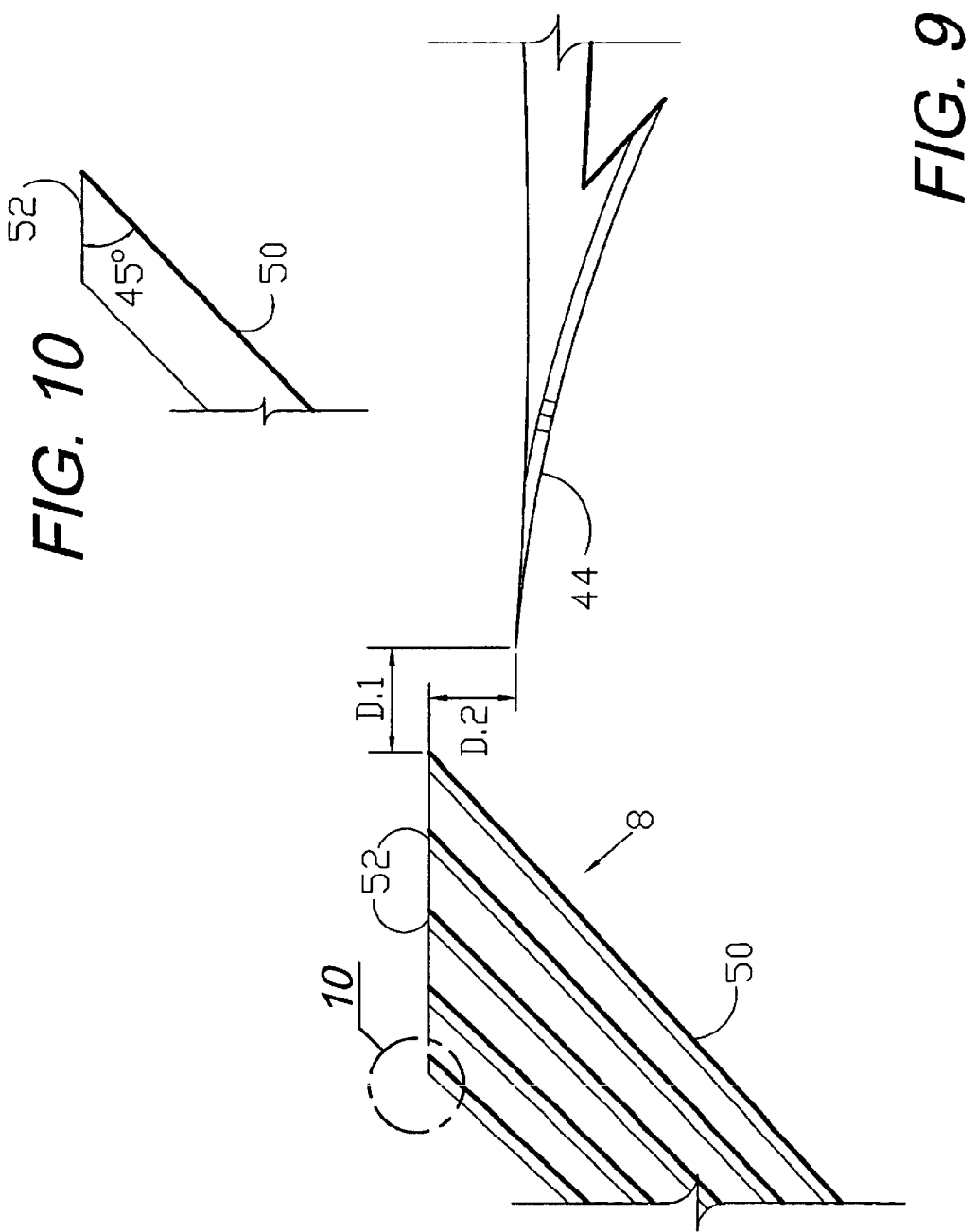

ANTI-SNAG FISHING JIG

CROSS REFERENCE TO RELATED APPLICATION

This application is a Continuation-in-Part of and claims priority in U.S. Pat. application Ser. No. 10/219,177, filed Aug. 15, 2002, now abandoned.

BACKGROUND OF THE INVENTION

1. Field of the Invention

The present invention relates generally to fishing tackle, and in particular to a jig with anti-snag performance features.

2. Description of the Prior Art

Fishing is one of the oldest and most universal activities. It is practiced in most parts of the world and by many cultures. Both vocational and recreational fishing are extremely popular. Participants include almost all age groups.

Fishing equipment, or "tackle", has been in use for several millennia. A wide variety of such fishing tackle it is presently on the market. The general concept of a hook baited with natural or artificial bait and tied to a line is very well known and forms the basis for a large percentage of current fishing tackle. Other types of equipment include spears, nets, traps, etc.

Fishhooks are commonly baited with various types of natural and artificial bait. The choice of bait depends upon the species of fish being sought and other criteria, such as water conditions, lighting, season, etc. Artificial fishing lures are commonly designed to simulate the natural food of particular fish species.

Many fishing lures are operated with casting and retrieval techniques. Their movements during retrieval simulate swimming prey in order to attract fish. Fish can also be attracted by sound, such as the sounds emitted by rattles and other noisemakers, as the lures are pulled through the water.

Jigs comprise a class of fishing tackle adapted for mounting bait, either natural or artificial. They typically include life-like features, which are intended to enhance their attractiveness to the species of fish being sought. Such features can include formed bodies, eyes, protrusions, etc. The object of such designs is to enhance their resemblance to marine life.

Although jigs offer many advantages and are widely regarded as effective fishing tackle for many types of game fish, they tend to be susceptible to loss from snagging on submerged objects. Such objects can include trees, brush, rocks, etc. Jigs are commonly lost as they are being retrieved or "reeled in" through such obstacles. Anglers tend to extensively fish among submerged brush and trees because fish typically seek cover and food in such conditions. Therefore, many anglers put their jigs at risk by casting directly into submerged timber and brush piles which are known to harbor game fish. The projecting hooks, which are characteristic of jigs, tend to engage and snag submerged objects of all types, particularly brush and trees. Anglers must then resort to various jig extraction techniques. For example, hung up jigs can sometimes be extracted by pulling on them from different directions. Sometimes they can be reached and manually disengaged. However, such extraction techniques tend to be time-consuming and disruptive to fishing. When such techniques fail, hung up lures are typically abandoned.

The present invention addresses the aforementioned problems by providing a snag-resistant jig, which is highly attractive to fish and can be cast into and retrieved through brush and other submerged obstacles.

OBJECTS AND ADVANTAGES OF THE INVENTION

The principal objects and advantages of the invention include: providing an anti-snag fishing jig; providing such a jig which effectively resists snagging by submerged brush and other objects; providing such a jig which exhibits superior casting and retrieval performance characteristics; providing such a jig which is adapted for use with slightly-modified standard fishhooks; providing such a jig which facilitates fishing in brush and other submerged cover; providing such a jig which can be finished with various paint and coating options; providing such a jig which is highly attractive to game fish; providing such a jig which can be manufactured in different sizes and configurations for various conditions; providing such a jig which is adaptable to various species; and providing such a jig which is economical to manufacture, efficient in operation and capable of a long operating life.

SUMMARY OF THE INVENTION

In the practice of the present invention, an anti-snag fishing jig is provided. The jig includes a generally spherical body. A fishhook includes a bent shaft extending through the body and terminating at a proximate end forming an eyelet located at the front and/or top of the jig body. A distal end of the fishhook shaft terminates at a barb. A deflector extends generally rearwardly and upwardly from the body and terminates in front of the barb. In operation, the orientation of the fishhook and the location of the deflector in front of its barb cooperate to resist snagging by deflecting brush and other submerged objects away from the barb.

BRIEF DESCRIPTION OF THE DRAWINGS

FIGS. 4a–c are sequential, side elevational views of the jig approaching, interacting with and clearing submerged brush from below.

FIG. 9 is a fragmentary, side elevational view of the jig, particularly showing the relationship between the deflector bristles and the hook barb.

FIG. 10 is an enlarged, side elevational view of a bristle distal end taken generally in circle 10 in FIG. 9.

DETAILED DESCRIPTION OF THE PREFERRED EMBODIMENTS

Figure 1:
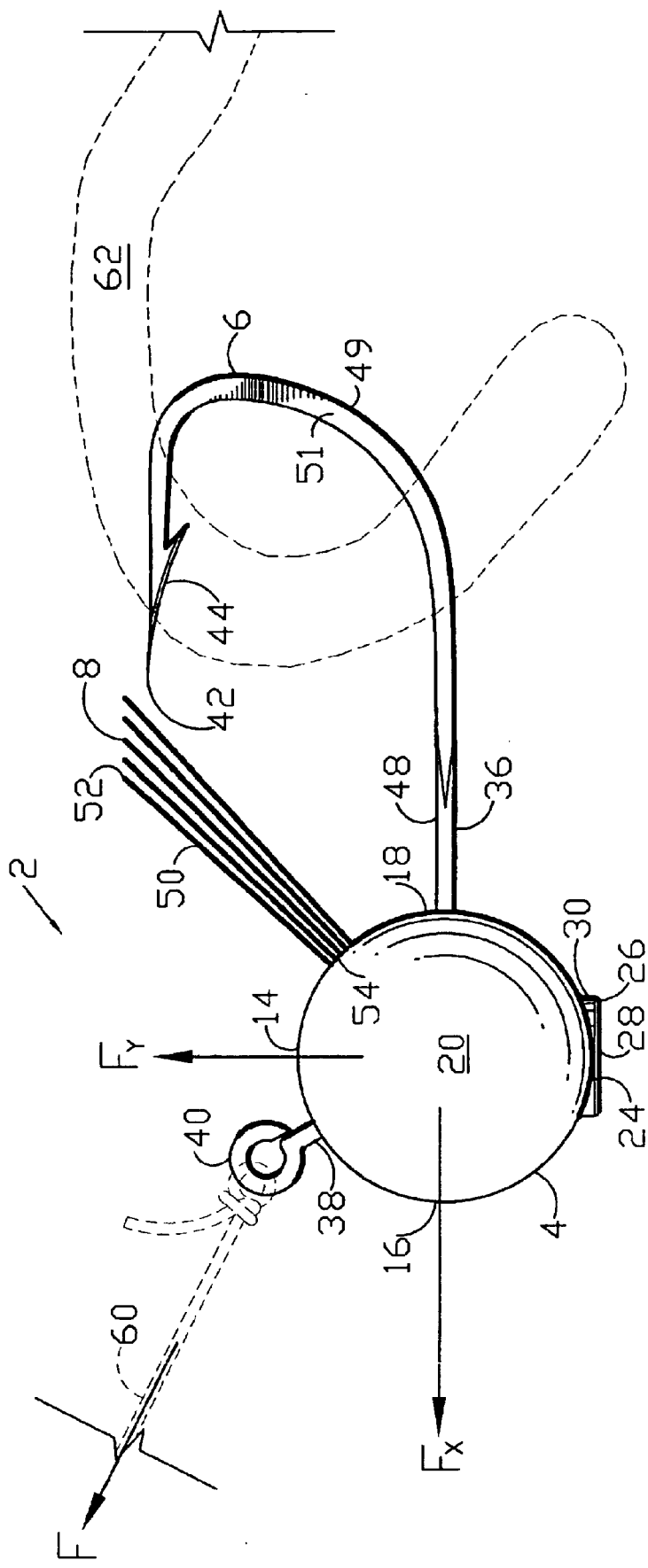
FIG. 1 is a side elevational view of an anti-snag fishing jig embodying the present invention.

I. Introduction and Environment.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 2 generally designates a fishing jig embodying the present invention. The jig 2 generally comprises a body 4, a fishhook 6 and a deflector 8.

II. Body 4.

Figure 2:
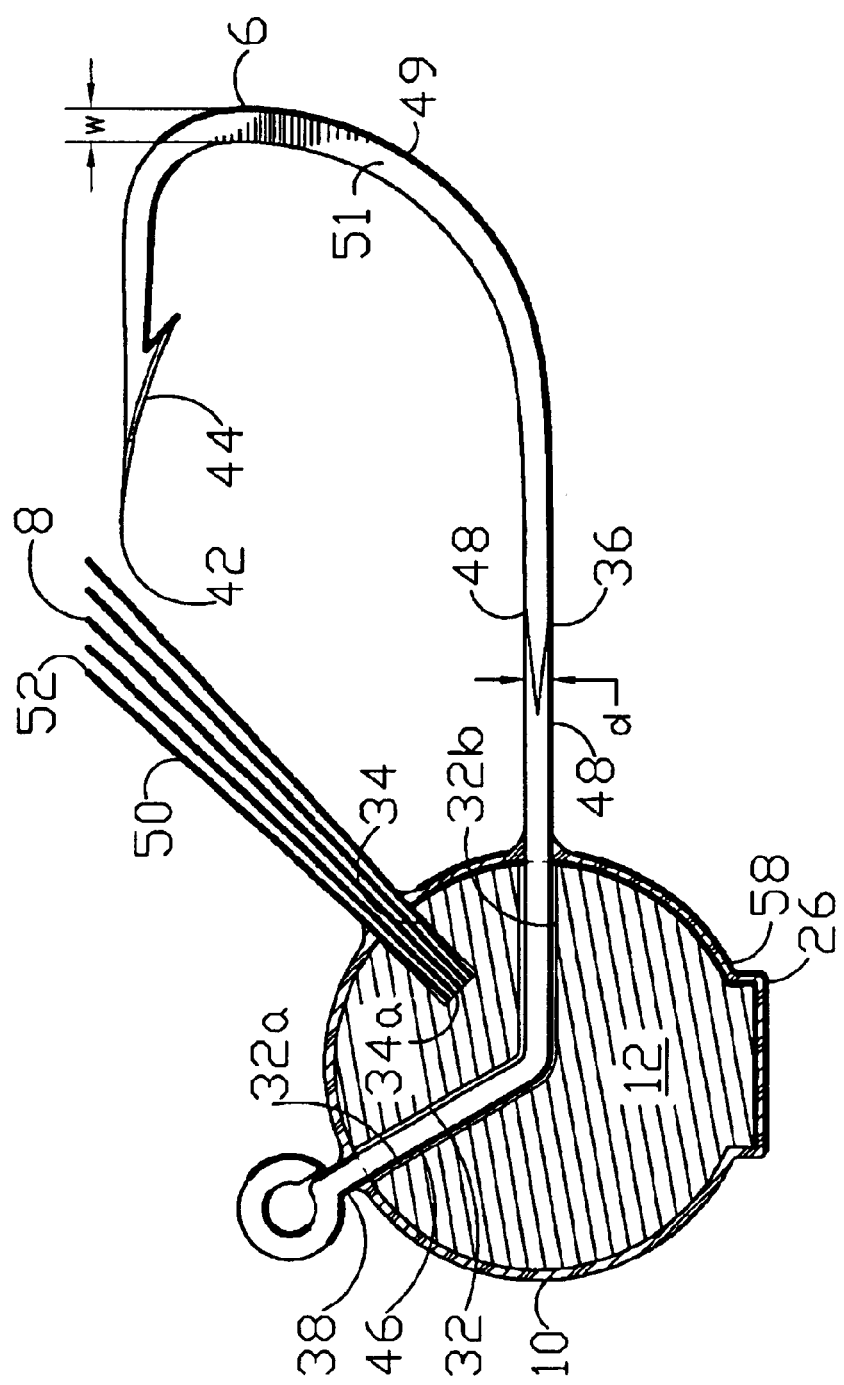
FIG. 2 is a vertical, cross-sectional view thereof, showing the internal construction of the jig.

As shown in FIG. 2, the body 4 is generally spherical with an exterior surface 10 and an interior 12. Although a solid, homogenous, material (e.g., lead or some other suitable metal) casting is shown for the body 4, other constructions could be utilized, such as hollow plastic, etc. The body 4 preferably has a relatively high density and mass to facilitate casting and negative buoyancy. However, other constructions could be utilized to achieve lighter weight, neutral buoyancy or even positive buoyancy (for a surface-floating jig). The body 2 has a top 14, a front 16, a back 18, and left and right sides 20, 22, all characterized by generally rounded configurations corresponding to their respective portions of the spherical configuration, which generally defines the body 4. A bottom 24 forms a base 26 protruding downwardly therefrom and having a generally cylindrical configuration with a circular lower face 28 and a base sidewall 30.

As shown in FIG. 2, the body 4 includes a fishhook passage 32, which includes a proximate section 32a extending downwardly and rearwardly from an opening in the upper front of the exterior. A passage distal section 32b extends forwardly from the back face 18 and joins the passage proximate section 32a at a location generally near the center of the body interior 12. A deflector receiver 34 is formed in an upper rear quadrant of the jig body 4 and is open at an upper rear portion of the body exterior surface 10. The deflector receiver 34 extends generally downwardly and forwardly into the body interior 12 and terminates at a blind end 34a, which is generally located in spaced relation above and behind the body center.

III. Fishhook 6.

The fishhook 6 can be chosen from among a wide variety of suitable designs, sizes and materials. The fishhook 6 is preferably sized in proportion to the body 4, with the jig 2 being generally sized to attract the species of fish for which it will be used.

The fishhook 6 as shown is forged from stainless steel for strength and corrosion resistance. The steel can be tempered for greater strength. Alternatively, brass-plated, bent-wire hooks can be employed. The hook 6 includes a shaft 36 with a proximate end 38 forming an eyelet 40 and a distal end 42 forming a barb 44. The shaft 36 includes a proximate section 46 extending downwardly and rearwardly from a proximate end 38 and forming a shaft angle (e.g., about 120° as shown) other shaft angles in the range of 90°–180°, such as 135° and 150° can be employed in the present-invention with an extension section 48, which extends rearwardly from the body 6. The apex of the shaft angle is located in proximity to the center of the body 6. A shaft return section 49 curves generally upwardly from the extension section 48 through approximately 180° and terminates at the barbed distal end 42. The shaft return section 49 is flattened on its sides at 51 to provide a somewhat rectangular cross-sectional profile with a width "w" greater than diameter "d". Such a rectangular profile is structurally more efficient with a higher bending load capacity and greater stiffness than a standard bent-wire fishhook with a circular cross-sectional profile.

IV. Deflector 8.

The deflector 8 includes plastic bristles 50 with proximate ends 54 secured in the deflector receiver 34 and distal ends 52 located generally in front of and slightly above the hook barb 44. The bristles 50 can comprise any suitable material, and are preferably flexible with a memory characteristic whereby they straighten out to their original shape after deflecting. Any suitable number bristles 50 can be utilized. The deflector 8 can also comprise a single strip or length of semi-rigid, flexible material. Various plastics, such as nylon, are suitable for this purpose. Other materials with the desired characteristics would also be suitable, such as fine wires comprised of stainless steel, etc.

V. Construction and Operation.

The jig 2 can be constructed using any suitable procedure. For example, a mold can receive the fishhook 6 and the deflector 8, whereafter the body 4 is cast of molten metal or some other suitable material. For example, molten lead is commonly used for casting fishing tackle where density and mass are desirable for providing relatively high sink rates. Bismuth is also used for casting fishing jigs. Still further, the body 4 can be cast of plastic, natural or synthetic rubber, etc. By casting or molding the body 4, the fishhook 6 and the deflector 8 can be securely embedded therein by the curing or drying action of the cast or poured body material.

The jig 2 includes an optional coating 58, which can be applied by any suitable procedure, such as dipping, spraying, brushing, etc. Various paint and coating products can be applied to the jig in order to achieve a desired effect. For example, brightly-colored or reflective paint can be applied to improve visibility, particularly in murky water and in low light level conditions.

In operation, the jig 2 is secured to a suitable line 60 and the hook 4 is baited with a worm, such as that shown at 62. The mass of the jig 2 facilitates casting and provides a relatively high sink rate. The base 26 improves performance of the jig 2 by providing ballast whereby the normal orientation of the jig 2 is upright as shown in FIGS. 1 and 2. The flat, circular, base lower face 28 tends to resist passage through water as the jig 2 sinks. Such resistance, particularly to downward sinking, causes the jig 2 to wobble and sway, possibly emitting turbulence. Such motion and its attendant water-born vibration tend to attract fish.

Figure 3A:
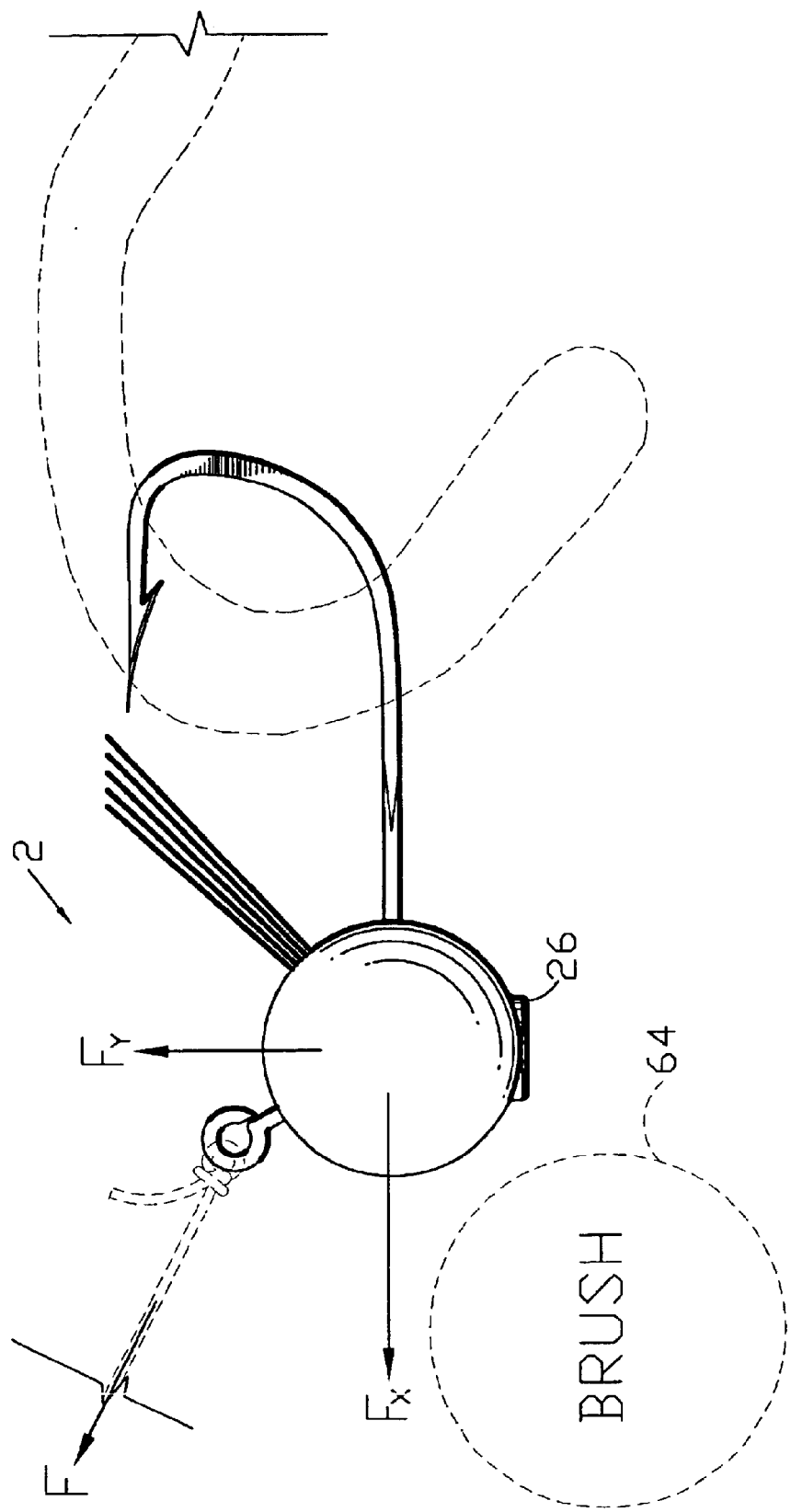
FIGS. 3a–c are sequential, side elevational views of the jig approaching, interacting with and clearing submerged brush from above.
Figure 3B:
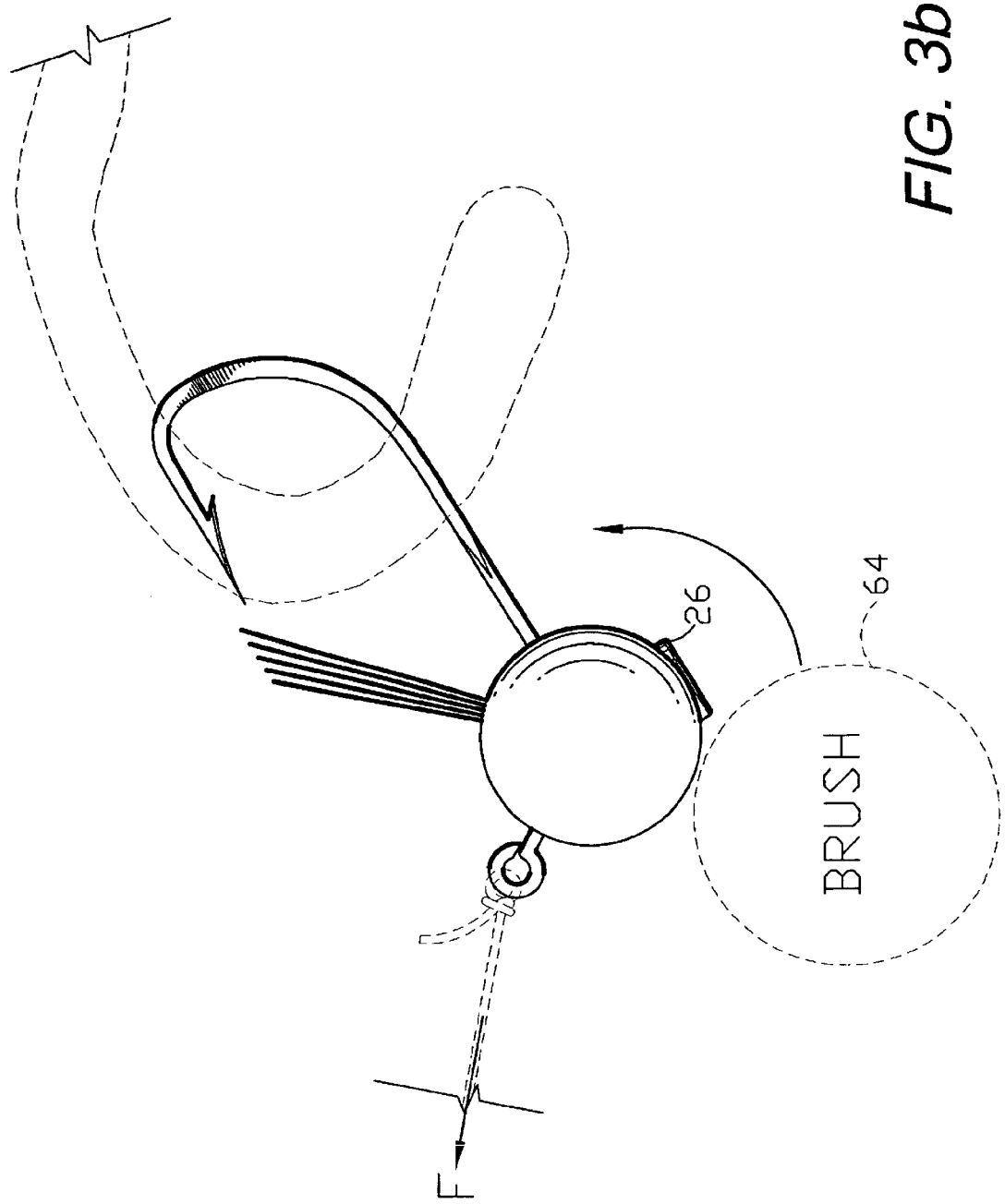
Figure 3C:
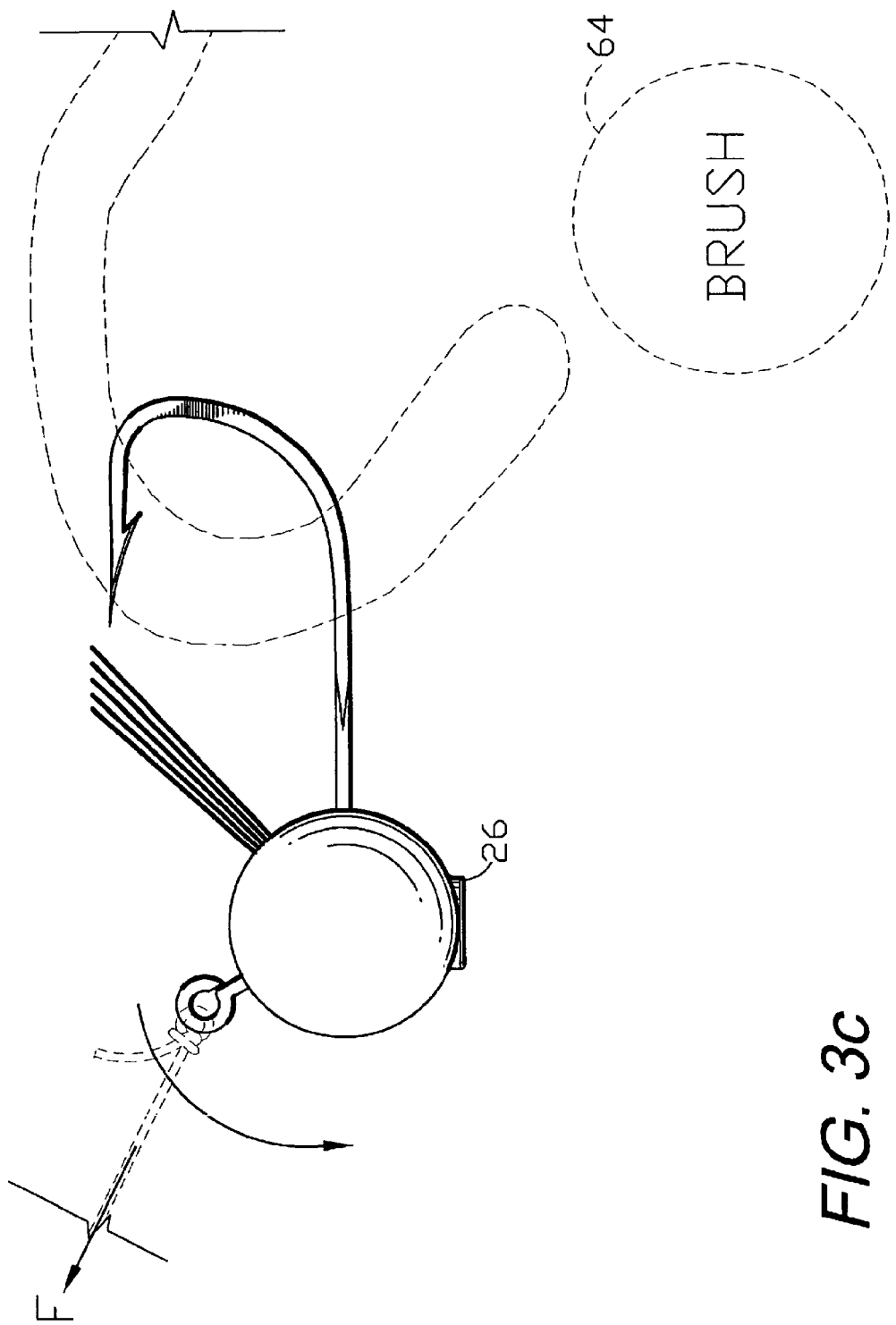

FIGS. 3a–c show an action sequence as the jig 2 encounters brush 64, beginning with an approach as shown in FIG. 3a. In FIG. 3b the jig 2 rotates counterclockwise in reaction to encountering the brush 64. FIG. 3c shows the jig 2 rotated clockwise back to its normal upright orientation. The upward orientation of the hook 8, combined with the configuration of a generally spherical body 4, cooperate to deflect the jig 2 over most brush and other obstacles encountered by same. Hence, regardless of the location where the jig 2 engages the brush 64, the barb 44 will be prevented from snagging the brush 64 whereby the jig 2 could be hung up and possibly lost.

Figure 4A:
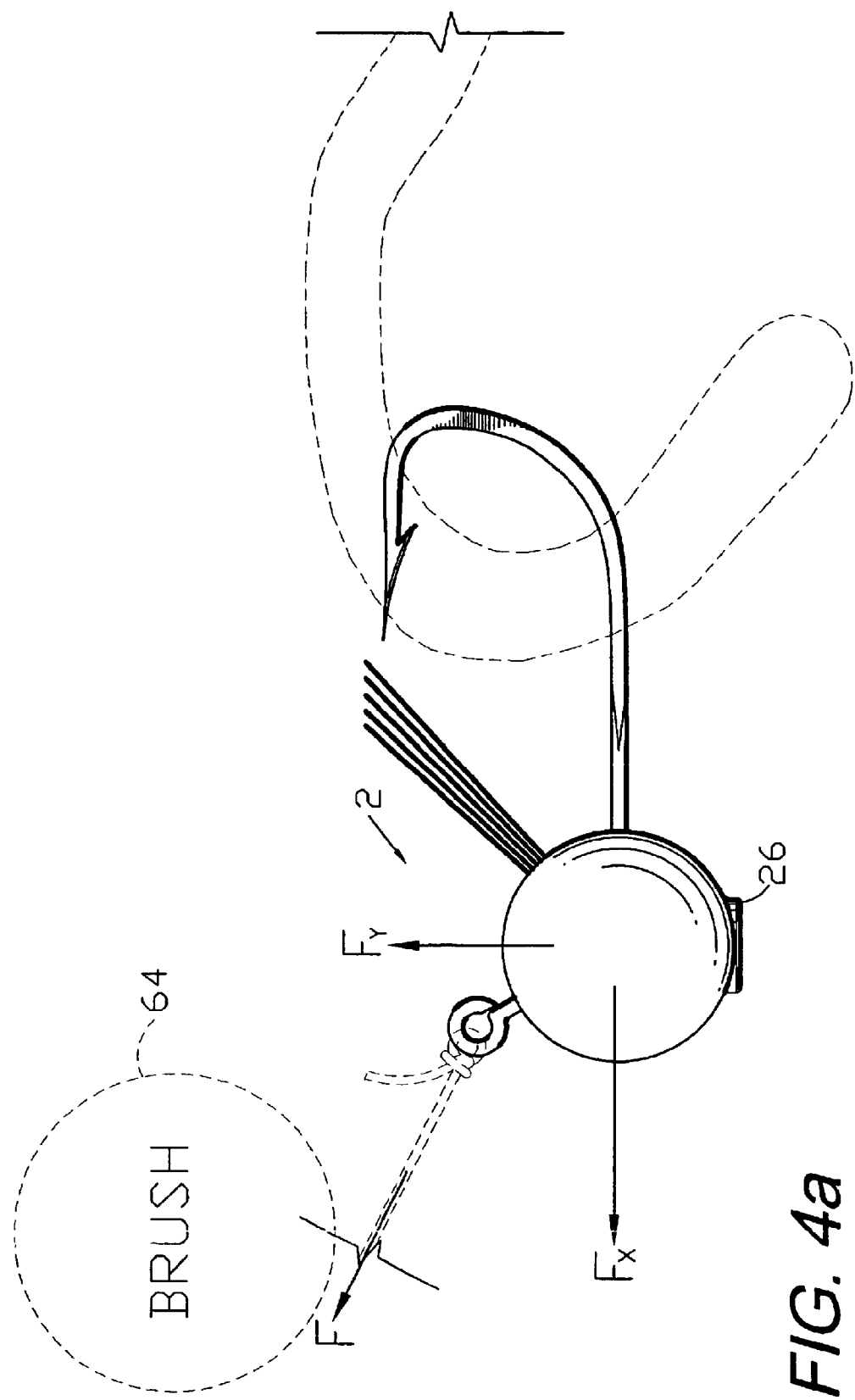
Figure 4C:
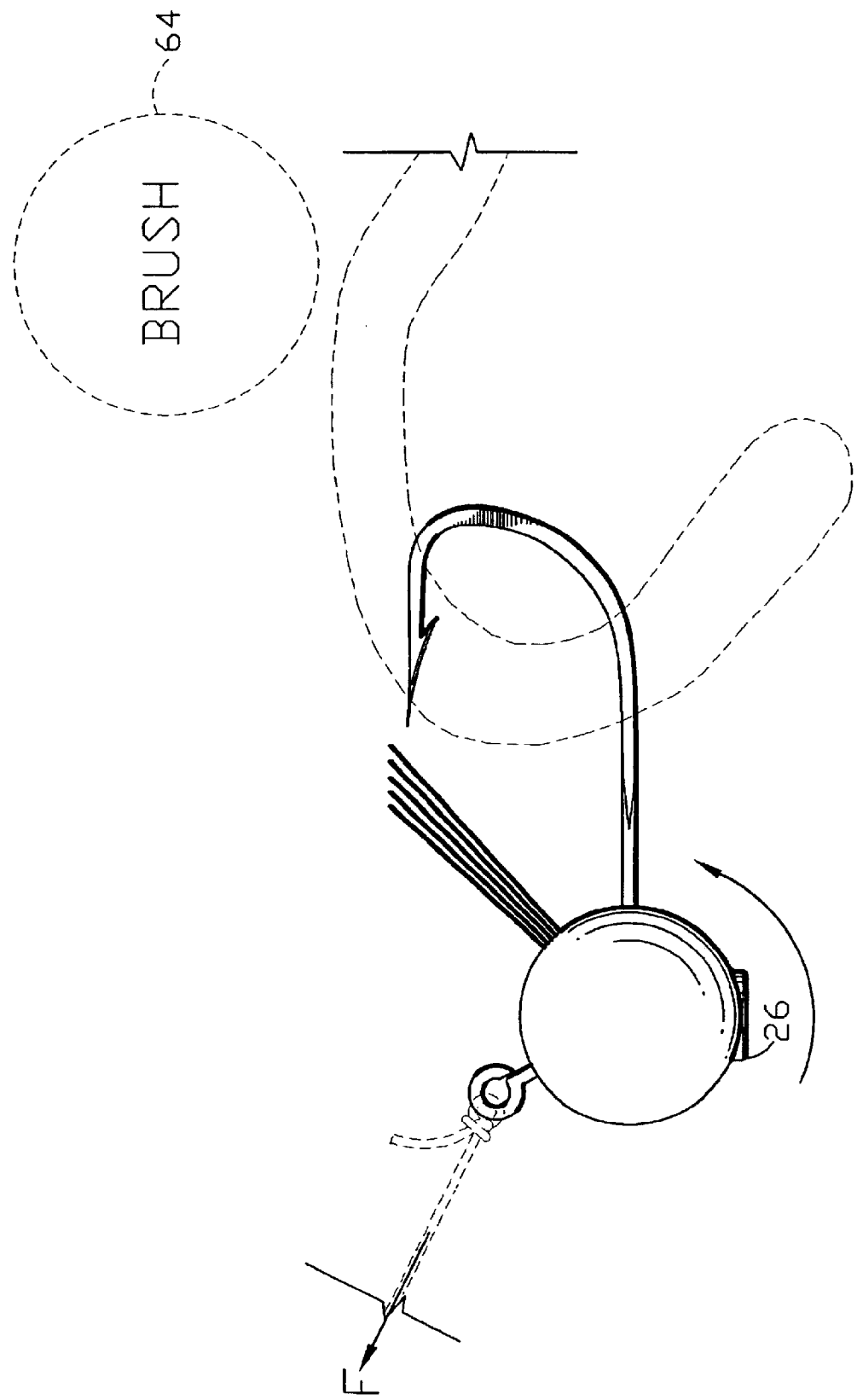

FIGS. 4a–c show an action sequence beginning with FIG. 4a wherein the jig 2 approaches the brush 64 from underneath. Upon the encountering brush 64, the deflector 8 engages same and rotates the jig 2 clockwise (FIG. 4b). The hook barb 44 is thus positioned away from the brush 64 to prevent the jig 2 from becoming snagged and possibly lost. The deflector 8 is preferably sufficiently stiff to rotate the jig 2 upon encountering brush and other obstacles, but is also sufficiently flexible to bend out of the way when a fish strikes whereby the hook barb is exposed and can be set when the line 60 is pulled by an angler. FIG. 4c shows the jig 2 clear of the brush 64 and passing underneath same.

Some of the more popular species of game finish are commonly caught in brush, trees and other submerged objects which tend to provide cover for the fish and their food sources. Thus, anglers often direct their casts into brush and other cover. With the anti-snag characteristics of the present invention, the jig 2 can be used relatively effectively in such cover and will normally be retrieved from same. Moreover, an angler can deliberately engage brush and other submerged objects to create the banging sounds which fish tend to respond to. For example, an angler can cast the jig 2 directly into a brush pile and generate noise to attract fish by deliberately striking a number of submerged branches without snagging the jig on same. Thus, the ability to fish in dense cover provides the jig 2 with significant operational advantages.

VI. First Alternative Embodiment Jig 102.

Figure 5:
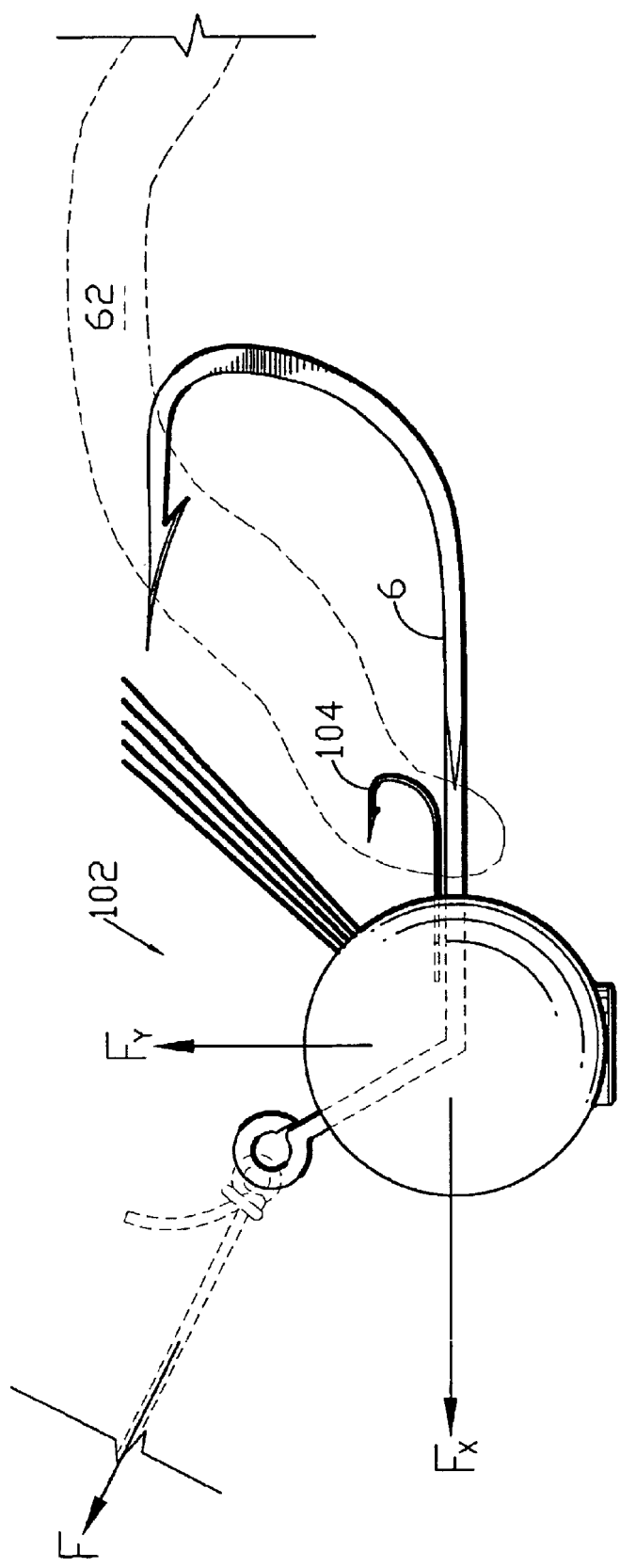
FIG. 5 is a side elevational view of a double-hook jig comprising a first alternative embodiment of the present invention.

FIG. 5 shows a jig 102 comprising a first alternative embodiment of the present invention and including a secondary or auxiliary fishhook 104 positioned generally within the primary fishhook 6 and mounting bait such as a worm 62. The secondary fishhook 104 facilitates hooking a game fish by providing a secondary location where a strike will result in the fish being caught. The secondary fishhook 104 can be somewhat smaller than the primary fishhook 6. For example, and without limitation on the generality of useful sizes of the fishhooks 104 and 6, the former can comprise a number 000 fishhook and the latter a number 10 fishhook.

VII. Second Alternative Embodiment Jig 202.

Figure 6:
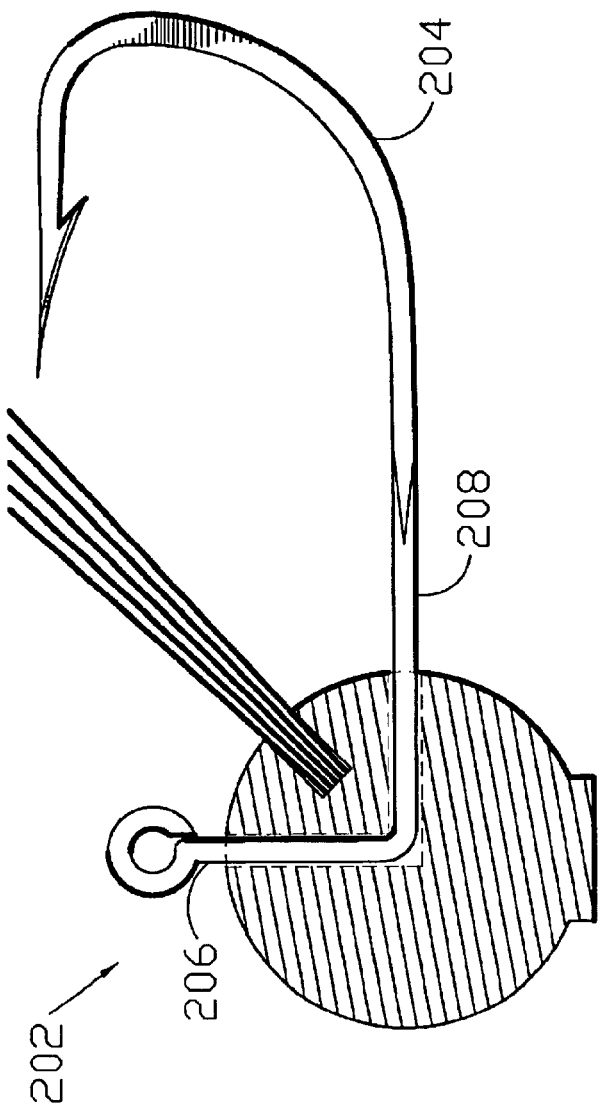
FIG. 6 is a vertical, cross-sectional view of a jig comprising a second alternative embodiment of the present invention with a fishhook shaft bent at a 90 degree angle.

FIG. 6 shows a jig 202 comprising a second alternative embodiment of the present invention and including a fishhook 204 with bent-shaft proximate and extension sections 206, 208 forming an angle of approximately 90 degrees with respect to each other. It will be appreciated that the pulling characteristics of the jig 202 will differ from the jigs described above because an eyelet 209, which transfers the pulling force, is located generally on top of the jig 202. The jig 202 includes a body 210 with a coating 212 of high-visibility paint or some other suitable material.

VIII. Third Alternative Embodiment Jig 302.

Figure 7:
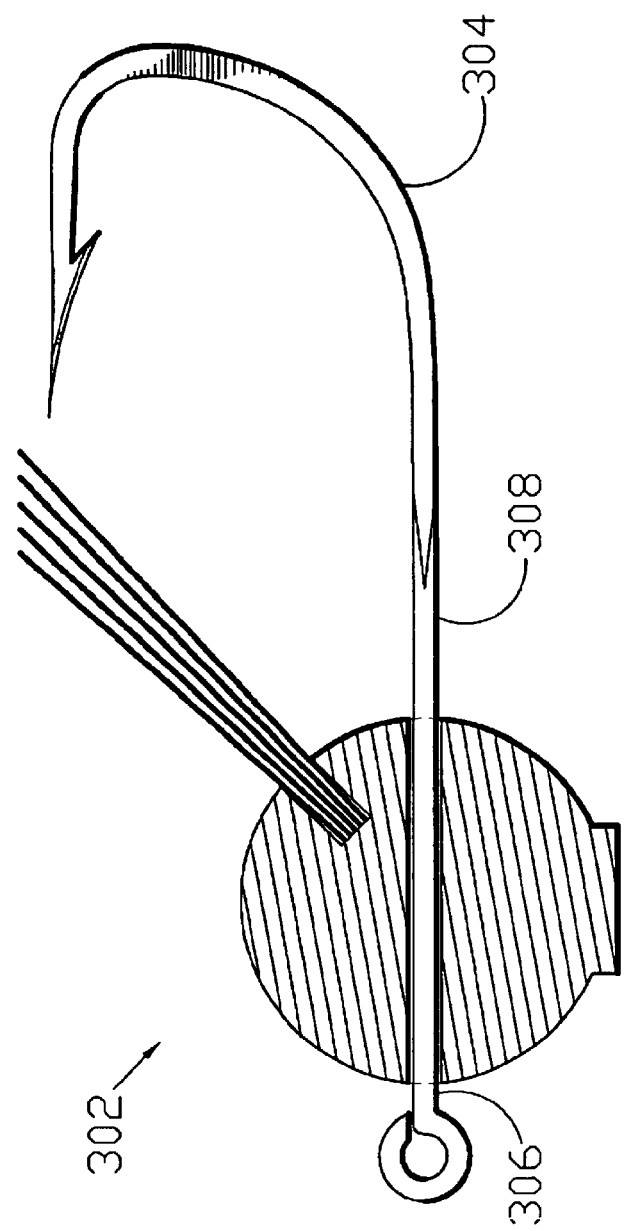
FIG. 7 is a vertical, cross-sectional view of a jig comprising a third alternative embodiment of the present invention with a straight fishhook shaft.

FIG. 7 shows a jig 302 comprising a third alternative embodiment of the present invention and including a fishhook 304, which has a straight shaft 306 with aligned proximate and distal sections 306, 308.

IX. Jig Engagement Operation.

Figure 8:
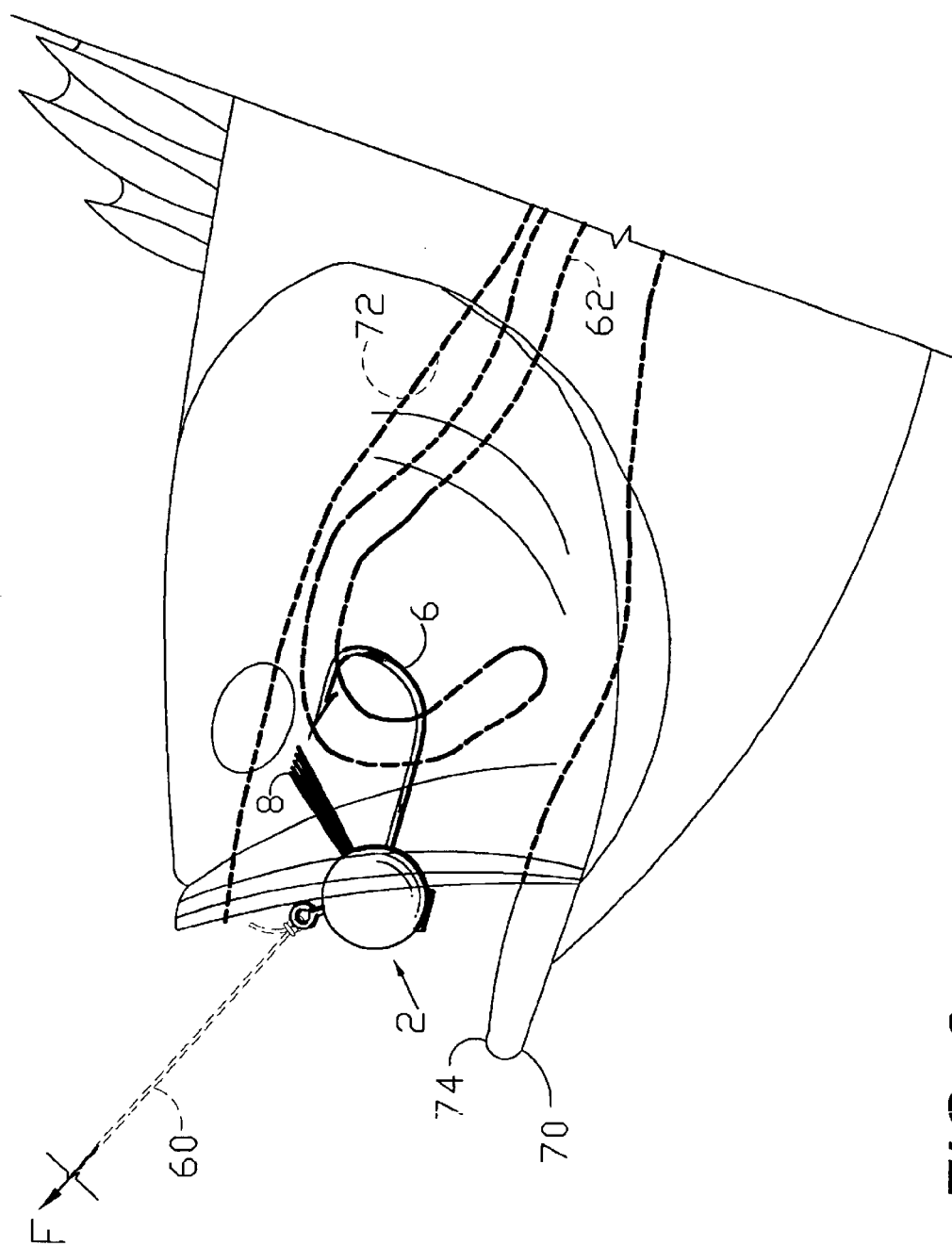
FIG. 8 is a side elevational view of the jig entering the mouth and gullet of a fish.

FIGS. 8–10 show the jig 2 in position for hooking a fish 70, and the detailed construction of the deflector 8 in relation to the hook barb 44. As shown in FIG. 8, the fish 70 has an expanded gullet 72, which accommodates the jig 2 and the worm 62. The configuration of the bristle distal ends 52 preferably places them below the level of the worm 62, whereby only the latter engages the roof of the fish's mouth 74 and gullet 72. The jig 2 is thus positioned well into the fish 70 before it has an opportunity to spit it out, whereby the chances of hooking the fish 70 are improved.

FIG. 9 shows the configuration of the bristle distal ends 52 with respect to the hook barb 44. The horizontal or longitudinal distance D.1 from the closest bristle end 52 to the hook barb 44 is preferably about 1/16 inch to 1/4 inch, which provides clearance in front of the barb 44 to facilitate its engagement. Otherwise the bristles 50 might deflect the fish from the barb 44 and prevent hooking. The vertical distance D.2 between the nearest bristle distal end 52 and the hook barb 44 is preferably less than 1/4 inch, for example, about 1/16 inch. The barb 44 is thus covered and less likely to snag brush and other debris.

Also as shown in FIG. 9, the bristle distal ends are angle cut so that they are generally level and maintain the vertical spacing D.2 from the barb 44. As shown in FIG. 10, the ends of the bristles 50 are angle cut at angles of approximately 45 degrees. Thus, bristles of uneven lengths can be embedded in the body 4 and their distal ends 52 can be sliced with one stroke to provide the bristle end configuration as shown in FIGS. 9 and 10.

X. Fourth Alternative Embodiment Jig 402.

Figure 11:
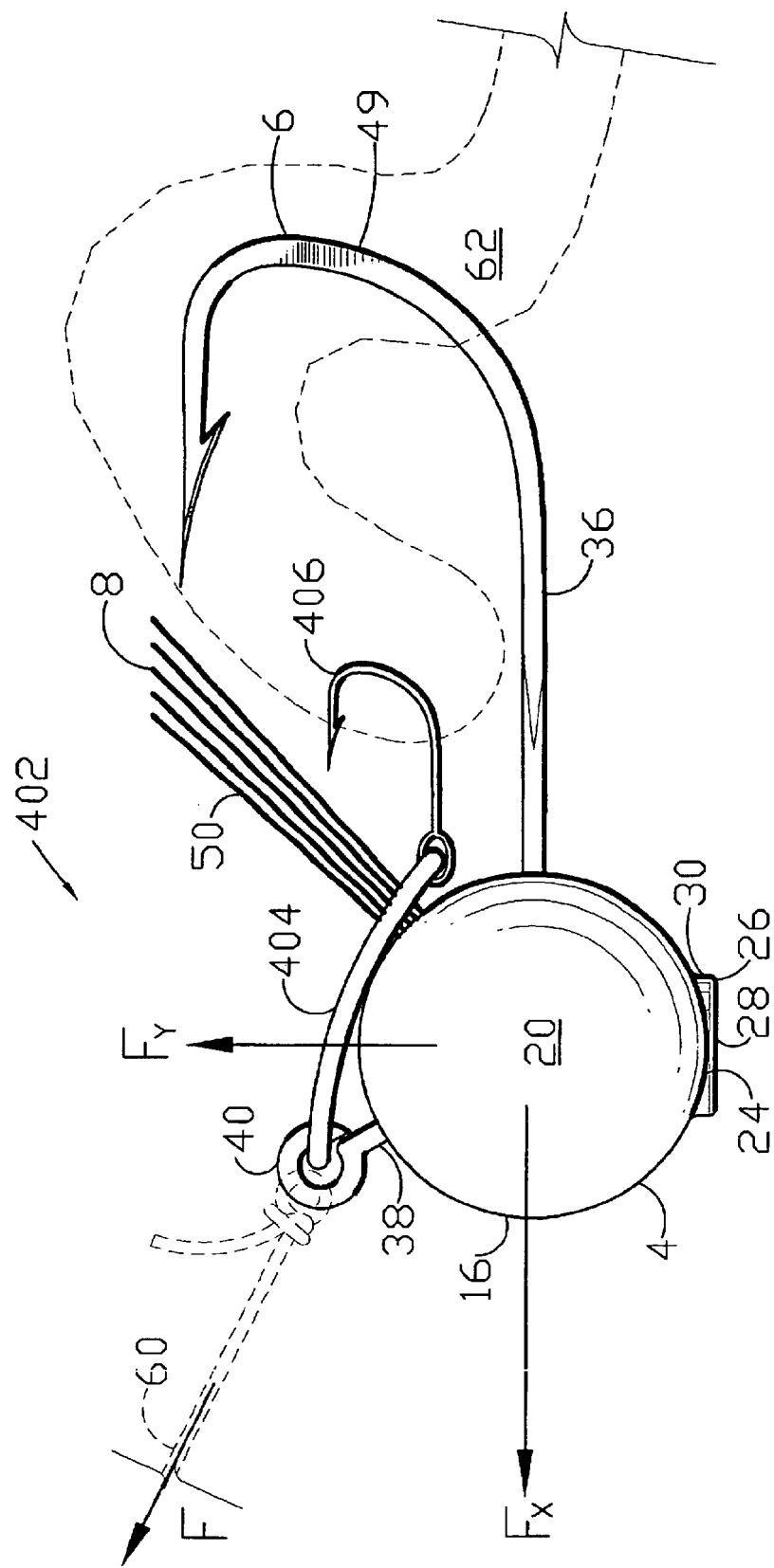
FIG. 11 is a side elevational view of a jig comprising a fourth alternative embodiment of the present invention with an auxiliary hook mounted on a rubber or elastic band.
Figure 12:
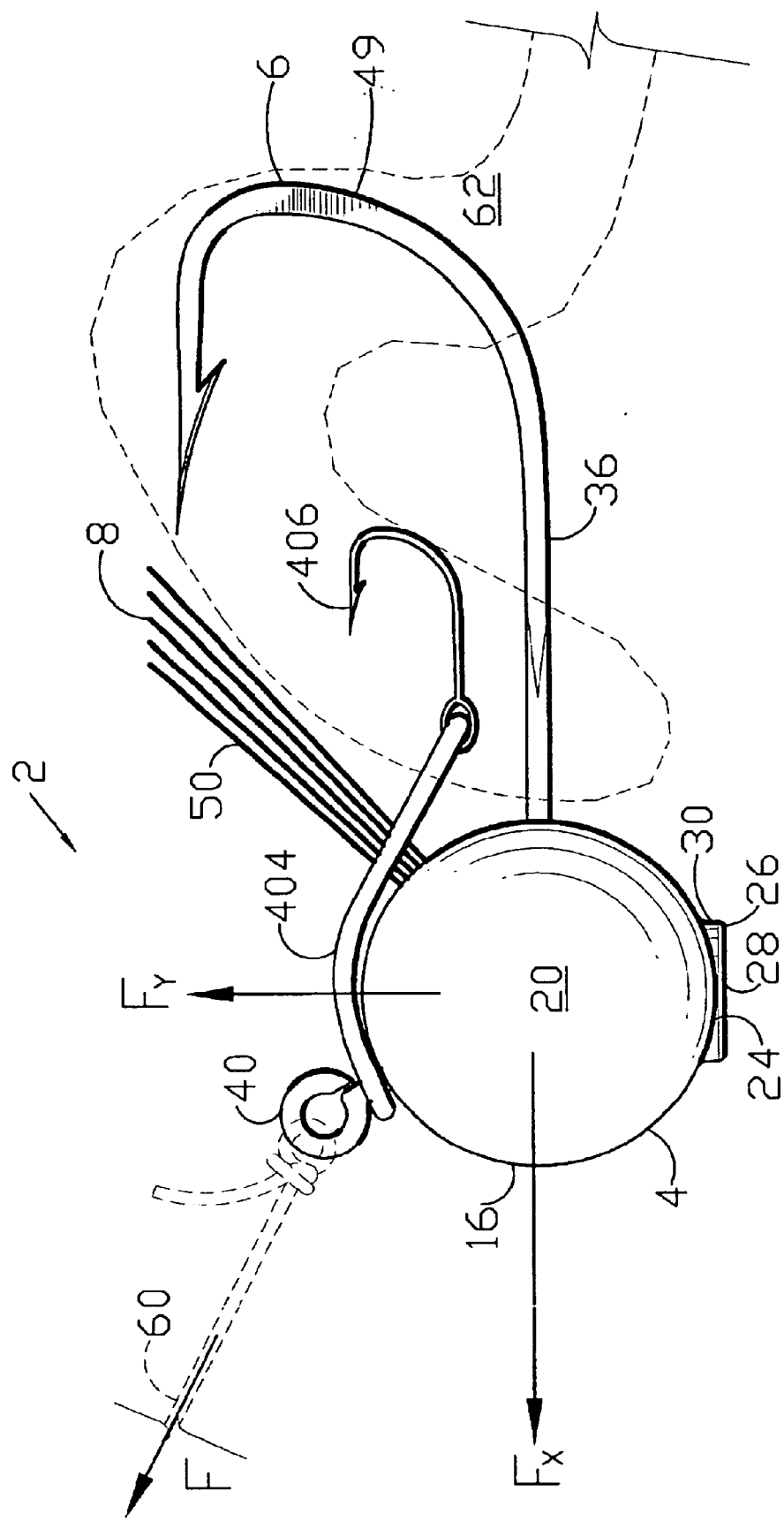
FIG. 12 is a side elevational view of the jig with an alternative mounting of the rubber or elastic band.

FIGS. 11 and 12 show a jig 402 comprising a fourth alternative embodiment or aspect of the present invention and including a resilient, flexible (e.g. rubber) band 404 received in the eyelet 40 and mounting an auxiliary hook 406 located generally behind the deflector 8. The auxiliary hook 406 is adapted for retaining the worm 62 in a relatively forward position, and particularly resists the worm 62 being pulled off of the jig 2 by a fish. FIG. 12 shows a variation for mounting the rubber band 404 whereby it slips over the front of the fishhook eyelet 40.

XI. Fifth Alternative Embodiment Jig 502.

Figure 13:
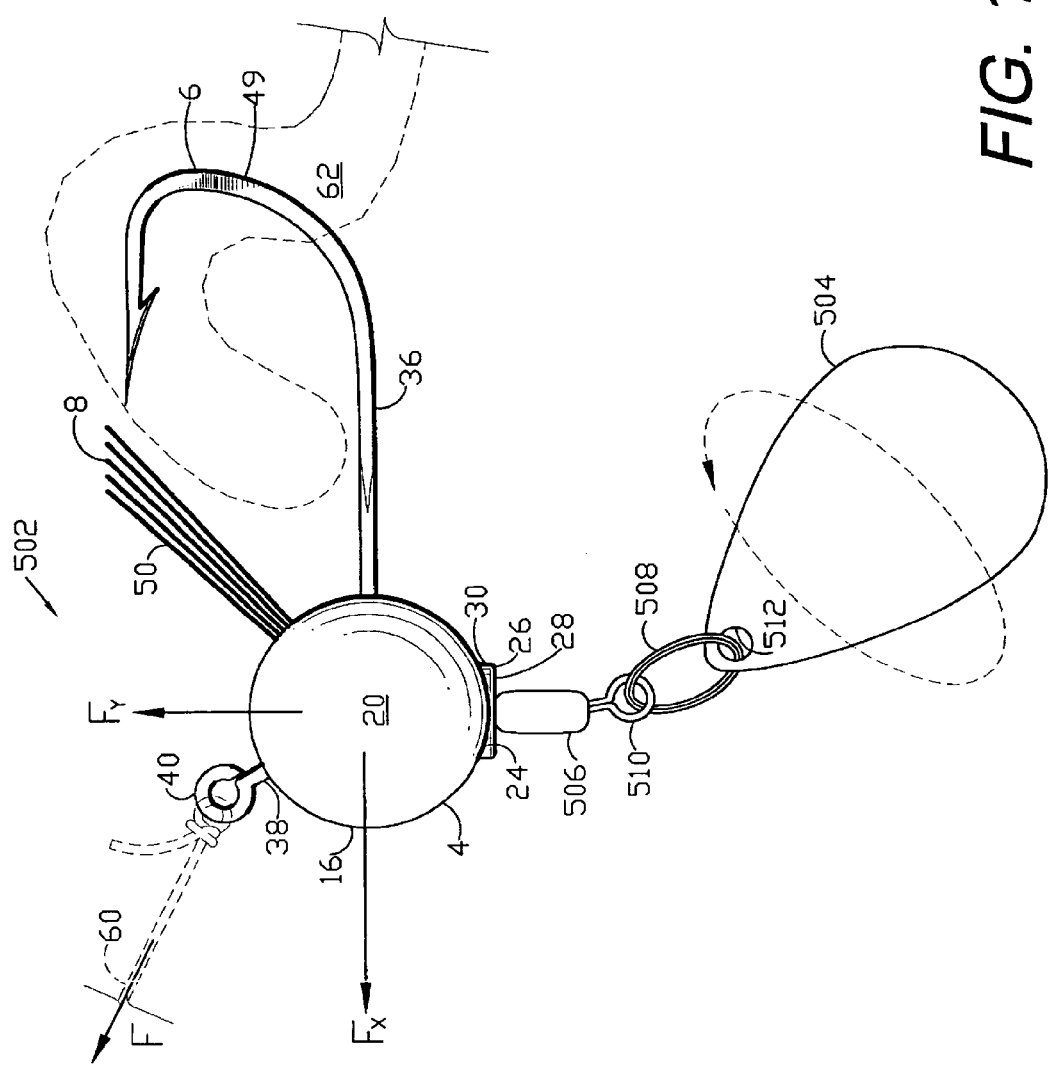
FIG. 13 is a side elevational view of a jig comprising a fifth alternative embodiment of the present invention with a spoon.
Figure 14:
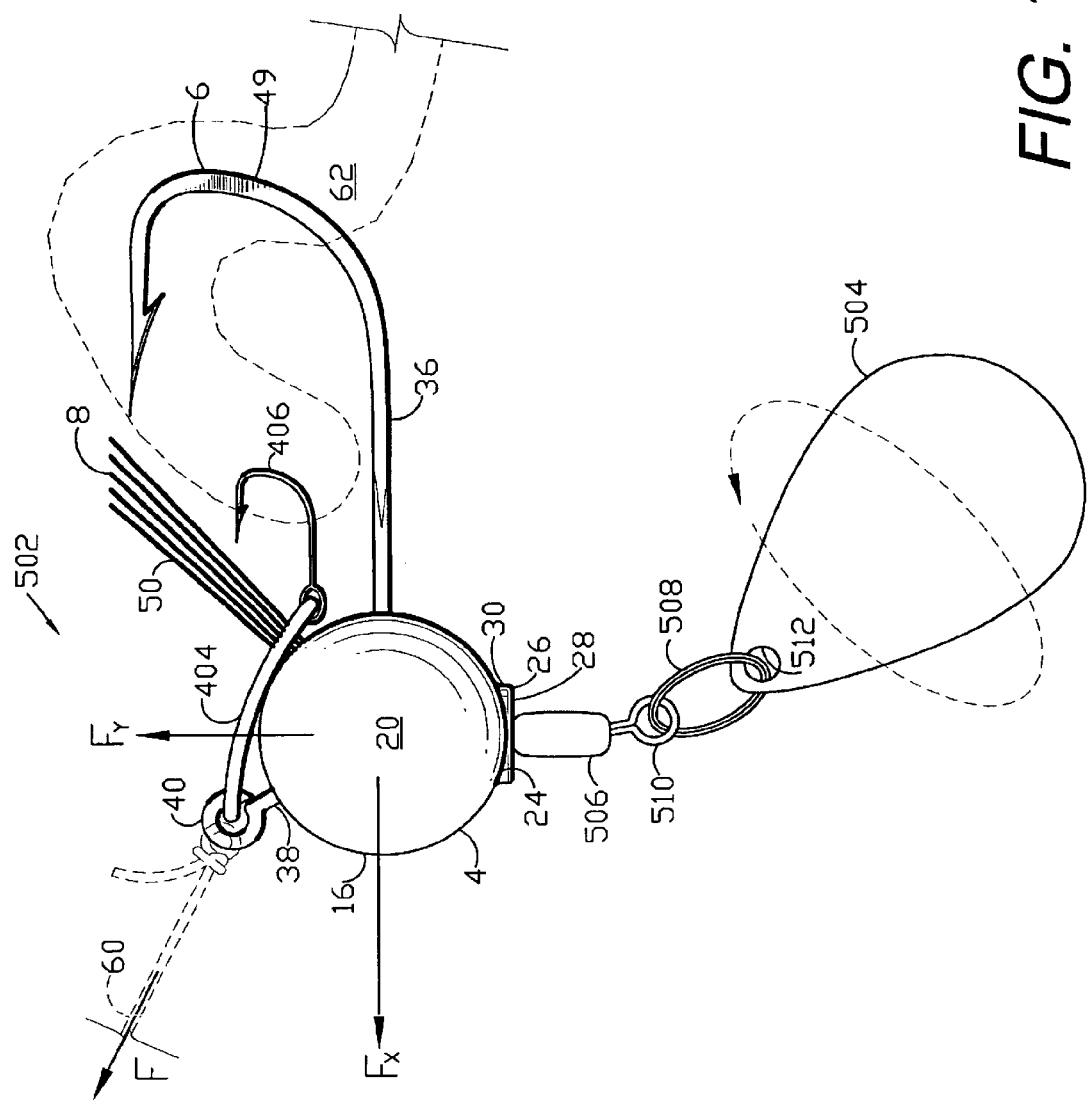
FIG. 14 is a side elevational view of the fifth alternative embodiment jig, shown with an auxiliary hook mounted on a rubber or elastic band.

FIG. 13 shows a jig 502 comprising a fifth alternative embodiment of the present invention with a spoon 504 depending downwardly from the body base 26 and suspended therefrom by a swivel connector 506, the upper end of which is embedded in the body base 26 and the lower end of which mounts the spoon 504 by means of a connecting ring 508 through an eyelet 510 in a lower end of the swivel connector 506 and a receiver 512 in an upper end of the spoon 504. FIG. 14 shows the jig 502 with an auxiliary hook 406 attached by a rubber band 404, as described above.

XII. Conclusion.

It is to be understood that while certain forms of the present invention have been illustrated and described herein, it is not to be limited to the specific forms or arrangement of parts described and shown.

Having thus described the invention, what is claimed as new and desired to be secured by Letters Patent is:

1. A fishing jig, which comprises:
   a generally spherical body including an exterior surface, an interior, a front, a back, a top, a bottom and a generally cylindrical base protruding downwardly from said bottom;
   said base having an annular base sidewall connected to said bottom and terminating at a relatively flat, circular base lower face, said face lying generally in a plane located below said body with said jig upright;
   a fishhook passage extending through said body and including first and second openings at said body exterior surface;
   a fishhook mounted on said body and projecting outwardly from the exterior surface thereof, said fishhook including a shaft;
   said fishhook shaft including a proximate end, a distal end, an extension section, a curved return section connected to said extension section and a barb connected to said return section and located at said shaft distal end;

said fishhook shaft including an inner section positioned within said passage and located generally between said shaft proximate end and said extension section;

said passage including a first leg extending inwardly into said body from said first opening and a second leg extending inwardly into said body from said second opening;

said inner section including first and second legs connected to each other and located generally between said proximate end and said extension section, said shaft first and second legs being received in said passage first and second legs respectively;

said first leg and passage first legs and said second leg and passage second legs forming angles of between 90 degrees to 180 degrees with respect to each other;

said fishhook being mounted in said body with its shaft extension section extending generally rearwardly therefrom and with said shaft return section extending generally upwardly from said extension section and with said barb located generally above said shaft extension section;

said body including a deflector receiver extending into the interior thereof and open at said body exterior surface between said body top and back;

a deflector with a proximate end and a distal end, said deflector extending generally upwardly and rearwardly from said body with said distal end thereof located in front of said barb, said deflector forming an angle of approximately 45 degrees with respect to said fishhook shaft extension section;

said deflector comprising a plurality of bristles, each said deflector bristle having a respective proximate end fixedly secured in said deflector receiver and a respective bristle distal end, said bristle distal ends being cut along a generally horizontal, longitudinally-extending line whereby said deflector distal end is angled at approximately 45 degrees;

said bristle distal ends terminating slightly above the level of said barb and said rearmost bristle distal end being located slightly in front of said barb;

said fishhook including a line connector comprising an eyelet formed at the proximate end of said fishhook shaft, said eyelet being positioned in spaced relation upwardly and forwardly from said body exterior surface in proximity to said passage first opening and adapted for connecting a line thereto; and said fishhook comprising a primary fishhook;

an auxiliary fishhook including an eyelet;

said auxiliary fishhook being substantially smaller than said primary fishhook; and a rubber or elastic band with a front end received in said primary fishhook eyelet and a back end received in said auxiliary fishhook eyelet; and said band extending over the top of said body, around said deflector proximate end and retaining said auxiliary fishhook in proximity to said body back.

2. The jig according to claim 1, which includes:
a layer of coating material on said body.

3. The jig according to claim 2 wherein said coating material comprises high visibility paint.

4. The jig according to claim 1 wherein said first leg and passage first leg and second leg and passage second legs are angled at approximately 120 degrees with respect to each other.

5. The jig according to claim 1 wherein said first leg and passage first leg and second leg and passage second legs are angled at approximately 135 degrees with respect to each other.

6. The jig according to claim 1 wherein said first leg and passage first lea and second leg and passage second legs are angled at approximately 150 degrees with respect to each other.

7. The jig according to claim 1 wherein said first and passage first lea and second leg shaft and passage second legs are angled at approximately 180 degrees with respect to each other.

8. The jig according to claim 1 wherein said bristle distal ends are positioned no more than ⅛ inch above the level of said barb and said bristles have varying lengths, with the frontmost bristle being shortest and the rearmost bristle being longest; and said rearmost bristle distal end is located no more than ¼ inch in front of said barb.

9. The jig according to claim 1 wherein said fishhook comprises forged, tempered, stainless-steel with said return section being relatively flat.

10. The jig according to claim 1, which includes:

a swivel connector depending downwardly from said base lower face and including an upper end fixedly embedded in said body and a freely rotatable lower end with an eyelet;

a connecting ring received in said swivel connector eyelet; and a spoon with: a first, convex side; a second, concave side; an attached end; and a receiver in said attached end receiving said connecting ring, said spoon being adapted to swivel with respect to said body about said swivel connector as said fishing jig is pulled through water.

11. A fishing jig, which comprises:

a generally spherical body including an exterior surface, an interior, a front, a back, a top, a bottom and a generally cylindrical base protruding downwardly from said bottom;

said base having an annular base sidewall connected to said bottom and terminating at a relatively flat, circular base lower face, said face lying generally in a plane located below said body with said jig upright;

a fishhook passage extending through said body and including first and second openings at said body exterior surface;

a fishhook mounted on said body and projecting outwardly from the exterior surface thereof, said fishhook including a shaft;

said fishhook shaft including a proximate end, a distal end, an extension section, a curved return section connected to said extension section and a barb connected to said return section and located at said shaft distal end;

said fishhook shaft including an inner section positioned within said passage and located generally between said shaft proximate end and said extension section;

said passage including a first leg extending inwardly into said body from said first opening and a second leg extending inwardly into said body from said second opening;

said inner section including first and second legs connected to each other and located generally between said proximate end and said extension section, said first and second legs being received in said passage first and second legs respectively;

said first leg and passage first legs and said second lea and passage second legs forming angles of between 90 degrees to 180 degrees with respect to each other;

said fishhook being mounted in said body with its shaft extension section extending generally rearwardly therefrom and with said shaft return section extending generally upwardly from said extension section and with said barb located generally above said shaft extension section;

said body including a deflector receiver extending into the interior thereof and open at said body exterior surface between said body top and back;

a deflector with a proximate end and a distal end, said deflector extending generally upwardly and rearwardly from said body with said distal end thereof located in front of said barb, said deflector forming an angle of approximately 45 degrees with respect to said fishhook shaft extension section; said deflector comprising a plurality of bristles, each said deflector bristle having a respective proximate end fixedly secured in said deflector receiver and a respective bristle distal end, said bristle distal ends being cut along a generally horizontal, longitudinally-extending line whereby each said bristle distal end is angled at approximately 45 degrees and said bristle distal ends are generally coplanar and flush;

said bristle distal ends terminating slightly above the level of said barb and said rearmost bristle distal end being located slightly in front of said barb;

said fishhook including a line connector comprising an eyelet formed at the proximate end of said fishhook shaft, said eyelet being positioned in spaced relation upwardly and forwardly from said body exterior surface in proximity to said passage first opening and adapted for connecting a line thereto;

a swivel connector depending downwardly from said base lower face and including an upper end fixedly embedded in said body and a freely rotatable lower end with an eyelet;

a connecting ring received in said swivel connector eyelet; and a spoon with: a first, convex side; a second, concave side; an attached end; and a receiver in said attached end receiving said connecting ring, said spoon being adapted to swivel with respect to said body about said swivel connector as said fishing jig is pulled through water.

12. The jig according to claim 11 wherein said body is coated with a coating material comprising a high visibility paint.

13. The jig according to claim 11 wherein said primary fishhook comprises forged, tempered, stainless-steel with said return section being relatively flat.

14. A fishing jig, which comprises:

a generally spherical body including an exterior surface, an interior, a front, a back, a top, a bottom and a generally cylindrical base protruding downwardly from said bottom;

said base having an annular base sidewall connected to said base bottom and terminating at a relatively flat, circular base lower face, said face lying generally in a plane located below said body with said jig upright;

a fishhook passage extending through said body and including first and second openings at said body exterior surface;

a primary fishhook mounted on said body and projecting outwardly from the exterior surface thereof, said primary fishhook including a shaft;

said fishhook shaft including a proximate end, a distal end, an extension section, a curved return section connected to said extension section and a barb connected to said return section and located at said shaft distal end;

said fishhook shaft including an inner section positioned within said passage and located generally between said shaft proximate end and said extension section;

said passage including a first leg extending inwardly into said body from said first opening and a second leg extending inwardly into said body from said second opening;

said inner section including first and second legs connected to each other and located generally between said proximate end and said extension section, said shaft first and second legs being received in said passage first and second legs respectively;

said first leg and passage first legs and said second leg and passage second legs forming angles of between 90 degrees to 180 degrees with respect to each other;

said primary fishhook being mounted in said body with its shaft extension section extending generally rearwardly therefrom and with said shaft return section extending generally upwardly from said extension section and with said barb located generally above said shaft extension section;

said body including a deflector receiver extending into the interior thereof and open at said body exterior surface between said body top and back;

a deflector with a proximate end and a distal end, said deflector extending generally upwardly and rearwardly from said body with said distal end thereof located in front of said barb, said deflector forming an angle of approximately 45 degrees with respect to said fishhook shaft extension section;

said deflector comprising a plurality of bristles, each said deflector bristle having a respective proximate end fixedly secured in said deflector receiver and a respective bristle distal end, said bristle distal ends being cut along a generally horizontal, longitudinally-extending line whereby each said bristle distal end is angled at approximately 45 degrees and said bristle distal ends are generally coplanar and flush;

said bristle distal ends terminating slightly above the level of said barb and said rearmost bristle distal end being located slightly in front of said barb;

said primary fishhook including a line connector comprising an eyelet formed at the proximate end of said fishhook shaft, said eyelet being positioned in spaced relation upwardly and forwardly from said body exterior surface in proximity to said passage first opening and adapted for connecting a line thereto;

a swivel connector depending downwardly from said base lower face and including an upper end fixedly embedded in said body and a freely rotatable lower end with an eyelet;

a connecting ring received in said swivel connector eyelet;

a spoon with: a first, convex side; a second, concave side; an attached end; and a receiver in said attached end receiving said connecting ring, said spoon being adapted to swivel with respect to said body about said swivel connector as said fishing jig is pulled through water;

an auxiliary fishhook including an eyelet;

said auxiliary fishhook being substantially smaller than said primary fishhook;

a rubber or elastic band with a front end received in said primary fishhook eyelet and a back end received in said auxiliary fishhook eyelet; and said band extending over the top of said body, around said deflector proximate end and retaining said auxiliary fishhook in proximity to said body back.

15. The jig according to claim 14 wherein said body is coated with a coating material comprising a high visibility paint.

16. The jig according to claim 14 wherein said primary fishhook comprises forged, tempered, stainless-steel with said return section being relatively flat.

* * * * *